United States Patent
Shi et al.

(10) Patent No.: US 11,644,188 B2
(45) Date of Patent: May 9, 2023

(54) WAKE-UP LIGHT

(71) Applicants: OPPLE LIGHTING CO., LTD., Shanghai (CN); SUZHOU OPPLE LIGHTING CO., LTD., Suzhou (CN)

(72) Inventors: Haoyang Shi, Suzhou (CN); Jie Qiang, Suzhou (CN); Jun Wu, Suzhou (CN); Xiaoming Fan, Suzhou (CN); Zhijun Li, Suzhou (CN); Zhixian Zhou, Suzhou (CN)

(73) Assignees: OPPLE LIGHTING CO., LTD., Shanghai (CN); SUZHOU OPPLE LIGHTING CO., LTD., Jiangsu (CN)

( * ) Notice: Subject to any disclaimer, the term of this patent is extended or adjusted under 35 U.S.C. 154(b) by 0 days.

(21) Appl. No.: 17/565,032

(22) Filed: Dec. 29, 2021

(65) Prior Publication Data

US 2022/0120422 A1 Apr. 21, 2022

Related U.S. Application Data

(63) Continuation of application No. PCT/CN2020/110015, filed on Aug. 19, 2020.

(30) Foreign Application Priority Data

Aug. 19, 2019 (CN) .......................... 201921348798.3

(51) Int. Cl.
*F21V 23/00* (2015.01)
*F21V 8/00* (2006.01)

(52) U.S. Cl.
CPC .......... *F21V 23/003* (2013.01); *G02B 6/0008* (2013.01)

(58) Field of Classification Search
CPC ........................... F21V 23/003; G02B 6/0008
See application file for complete search history.

(56) References Cited

U.S. PATENT DOCUMENTS

| 4,395,661 A | 7/1983 | Becker |
| 2004/0114386 A1* | 6/2004 | Hung ........................ B62J 6/01 362/555 |

(Continued)

FOREIGN PATENT DOCUMENTS

| CN | 101317139 A | 12/2008 |
| CN | 201547555 U | 8/2010 |

(Continued)

OTHER PUBLICATIONS

International Search Report of PCT Application No. PCT/CN2020/110015 dated Nov. 2, 2020 with English translation, (6p).

*Primary Examiner* — Bryon T Gyllstrom
(74) *Attorney, Agent, or Firm* — Arch & Lake LLP

(57) ABSTRACT

A wake-up light includes a shade, a housing, a power driver, a controller, a light source, and a timer. The power driver, the light source, the controller, and the timer are installed in a space enclosed by the shade and the housing; the power driver is externally connected to an alternating current, and supplies power to the timer and the light source; the timer is configured for real-time timing; the controller is connected to the light source and the timer; the controller receives timing information of the timer; when a first time set by a user is reached, the controller sends a light-source light-up signal to the light source so that a light intensity of the light source is gradually increased; and when a second time set by the user is reached, the controller sends an impulsive light signal to the light source so that the light source uninterruptedly emits impulsive light.

12 Claims, 4 Drawing Sheets

(56) References Cited

U.S. PATENT DOCUMENTS

| | | | |
|---|---|---|---|
| 2005/0174251 A1* | 8/2005 | Terry, III | G08B 7/062 |
| | | | 340/506 |
| 2008/0106422 A1* | 5/2008 | Sparks | E04H 4/148 |
| | | | 340/573.6 |
| 2009/0116234 A1 | 5/2009 | Inoue et al. | |
| 2011/0317526 A1* | 12/2011 | Go | G04G 11/00 |
| | | | 368/256 |
| 2012/0140600 A1* | 6/2012 | Chang | G04G 15/003 |
| | | | 368/10 |
| 2015/0102731 A1* | 4/2015 | Altamura | A47G 33/0836 |
| | | | 315/152 |
| 2015/0230318 A1* | 8/2015 | Go | G04G 13/02 |
| | | | 368/10 |
| 2015/0348390 A1 | 12/2015 | Berezhnyy et al. | |
| 2019/0274206 A1* | 9/2019 | Altamura | F21V 23/003 |
| 2022/0057078 A1* | 2/2022 | Reed | F21V 23/02 |

FOREIGN PATENT DOCUMENTS

| | | |
|---|---|---|
| CN | 102346436 A | 2/2012 |
| CN | 104066240 A | 9/2014 |
| CN | 204420671 U | 6/2015 |
| CN | 105190451 A | 12/2015 |
| CN | 205084163 U | 3/2016 |
| CN | 207249379 U | 4/2018 |
| CN | 109932924 A | 6/2019 |

\* cited by examiner

WAKE-UP LIGHT

CROSS-REFERENCE TO RELATED APPLICATIONS

This application is a continuation of PCT patent application No. PCT/CN2020/110015 filed on Aug. 19, 2020 which is based upon and claims priority to Chinese patent application No. 201921348798.3 filed on Aug. 19, 2019, the entire contents of which are hereby incorporated by reference herein for all purposes.

TECHNICAL FIELD

The present application belongs to field of household electrical appliances, and particularly relates to a wake-up light used to remind users that time is up in daily life.

BACKGROUND

At present, waking up with alarm clocks is a common way on the market to wake up users, which brings following harms: a), forcibly awakening the human body from deep sleep causes disorders of the endocrine system, resulting in discomforts to the human body such as suffering, forgetfulness, and drowsiness; and b), awakening the human body by stimulating the auditory nerve causes strain and stress to the nervous system and an increase of adrenaline, resulting in risks of cardiovascular and cerebrovascular diseases. Apparently, for users with poor health, long-term use of alarm clocks to wake up will affect the users' physical health.

Currently, there is a light wake-up technology on the market, and light wake-up products have been successfully launched. These products can relieve discomforts caused by alarm clocks by simulating sunrise light. A specific technical solution is that, in a period of time (which can be set by users) before a set alarm time, a light intensity is started to be gradually increased to a full brightness, and photochromism (color temperature) also gradually changes with the increase of the light intensity, simulating the change of sunrise from yellow-red light to colors of sunlight. The purpose is to have the body in preparation for being awakened before an alarm clock rings, and to regulate endocrine of the human body through effects of light on the biological rhythms in the human body to achieve waking up gently. The alarm clock starts to ring when a set time is reached. This solution can reduce the harm of sudden ringing of the alarm clock to users. However, for people in deep sleep, the sudden ringing will still cause sudden strain and stress, and the final ringing will still affect other people at rest.

SUMMARY

The purpose of the present application is to solve the problem that the alarm clock ringing in the prior art causes user discomfort and propose a new type of wake-up light.

In a first aspect of the present application, a wake-up light is provided. The wake-up light includes: a shade, a housing, a power driver, a controller, a light source, and a timer. The power driver, the light source, the controller, and the timer are installed in a space enclosed by the shade and the housing; the power driver is externally connected to an alternating current, and supplies power to the timer and the light source; the timer is configured for real-time timing; the controller is connected to the light source and the timer; the controller receives timing information of the timer; in response to determining that a first time set by a user is reached, the controller sends a light-source light-up signal to the light source so that a light intensity of the light source is gradually increased; and in response to determining that a second time set by the user is reached, the controller sends an impulsive light signal to the light source so that the light source uninterruptedly emits impulsive light.

In a second aspect of the present application, a wake-up light includes a shade, a base cover, a light source, a timer, a controller, and a light guide element. The light source, the controller, the timer, and the light guide element are installed in a space enclosed by the shade and the base cover; a light source is arranged on an upper surface and/or a lower surface of the light guide element; light rays of the light source are directed to the inside of the light guide element; the timer is configured for real-time timing; the controller is connected to the light source and the timer; the controller receives timing information of the timer; in response to determining that a first time set by a user is reached, the controller sends a light-source light-up signal to the light source so that a light intensity of the light source is gradually increased; and in response to determining that a second time set by the user is reached, the controller sends an impulsive light signal to the light source so that the light source uninterruptedly emits impulsive light.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art can still arrive at other drawings from the accompanying drawings without creative efforts.

DETAILED DESCRIPTION

To make the objectives, technical solutions, and advantages of the present application clearer, the following further describes the present application in detail with reference to the accompany drawings. Apparently, the described embodiments are merely some but not all of the embodiments of the present application. All other embodiments obtained by a person of ordinary skill in the art based on the embodiments of the present application without creative efforts shall fall within the protection scope of the present application.

The present application is further described below with reference to the accompany drawings.

Figure 1:
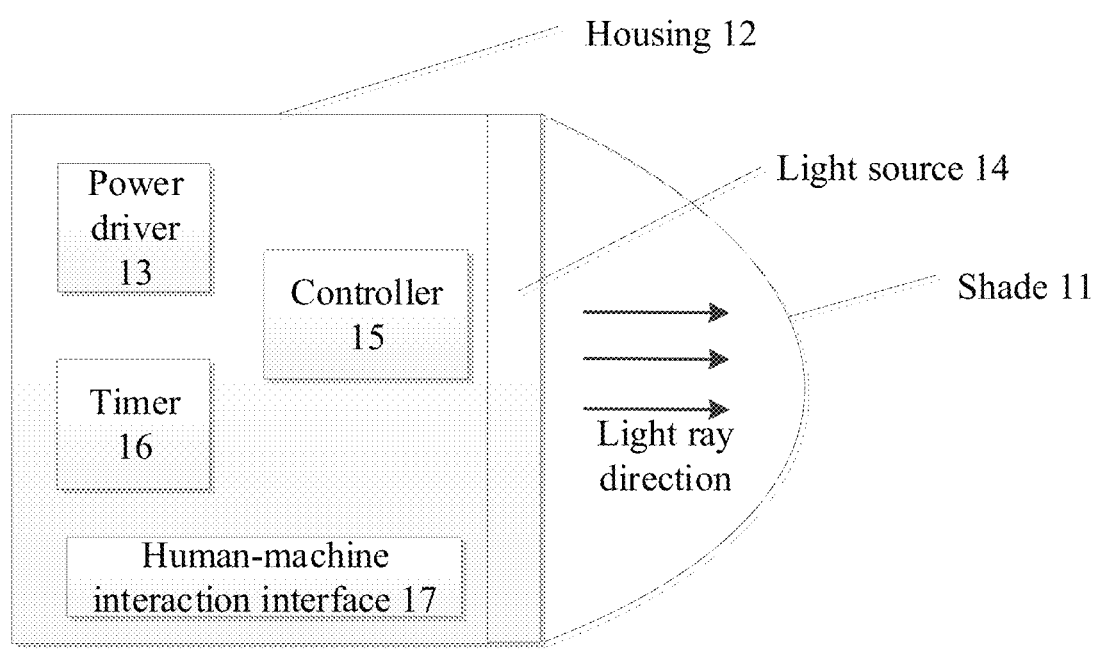
FIG. 1 is a schematic structural diagram of a wake-up light I according to a preferred embodiment of the present application.

FIG. 1 is a schematic structural diagram of a wake-up light I according to a preferred embodiment of the present application.

As illustrated in FIG. 1, a wake-up light 1 includes a shade 11, a housing 12, a power driver 13, a light source 14, a controller 15, a timer 16, and a human-machine interaction interface 17. The shade 11 and the housing 12 are connected through fasteners, threads or screws. The power driver 13, the light source 14, the controller 15, and the timer 16 are all disposed in a space enclosed by the shade 11 and the housing 12. The shade 11 is made of a transparent or semitransparent material, and preferably an acrylic material.

The power driver 13 is externally connected to an alternating current of 220V, converts the alternating current to a direct current of 12V/5V, and then supplies power to the light source 14, the controller 15, and the timer 16 in the wake-up light 1. A battery 18 (not illustrated in the figure) is preferably disposed inside the wake-up light 1. The battery 18 is connected to the power driver 13, and receives power charged from the power driver 13. In the case where the power driver 13 is disconnected to an external power supply, the battery 18 supplies power to electrical devices in the wake-up light 1.

The light source 14 is disposed at a joint between the shade 11 and the housing 12. Light of the light source 14 is perpendicularly directed to the shade 11. The human-machine interaction interface 17 is arranged on the housing 12 and can be used to display time information, battery status information, and other status information of the wake-up light 1 to a user. The human-machine interaction interface 17 can also be used to receive timing information input by a user, light configuration information of the wake-up light 1, and the like.

Figure 2:
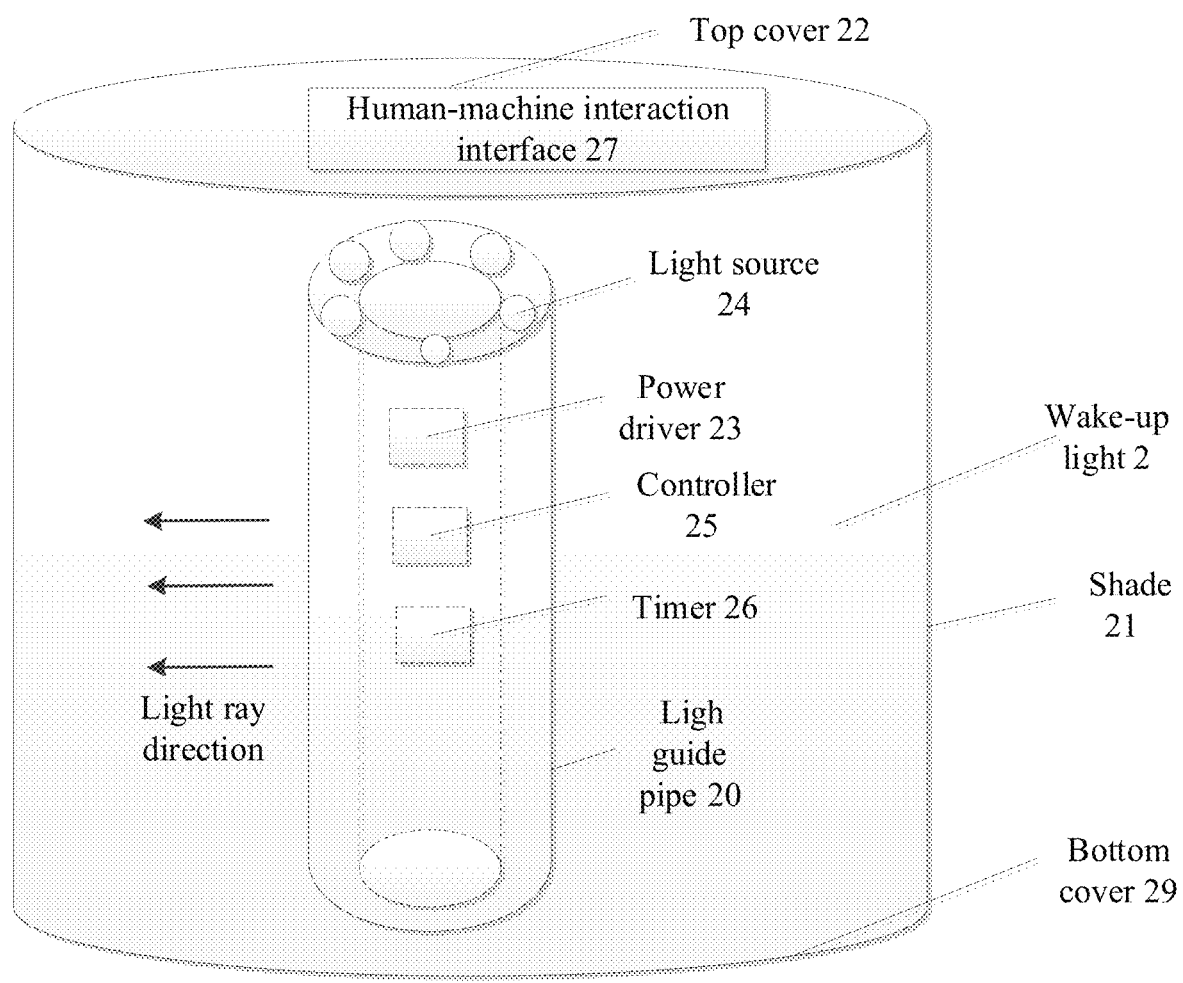
FIG. 2 is a schematic structural diagram of a wake-up light II according to a preferred embodiment of the present application.

FIG. 2 is a schematic structural diagram of a wake-up light II according to a preferred embodiment of the present application.

FIG. 2 is a schematic structural diagram of another wake-up light 2. As illustrated in FIG. 2, the wake-up light 2 includes a shade 21 and base cover. The base cover includes an upper cover 22 and a lower cover 29. A human-machine interaction interface 27 is arranged on an upper surface of the upper cover 221. The human-machine interaction interface 27 is used to display time information, battery status information, and other status information of the wake-up light 2 to a user. The human-machine interaction interface 17 can also be used to receive timing information input by a user, light configuration information of the wake-up light 2, and the like. A light guide pipe 20 is disposed in the wake-up light. The light guide pipe 20 is of a pipe structure. A power driver 23, a controller 25, and a timer 26 are disposed in a cylindrical space formed by an inner wall of the pipe structure of the light guide pipe 20. The power driver 23 is externally connected to an alternating current of 220V, converts the alternating current to a direct current of 12V/5V, and then supplies power to a light source 24, the controller 25, and the timer 26 in the wake-up light 2. A battery 28 (not illustrated in the figure) is preferably disposed inside the wake-up light 2. The battery 28 is connected to the power driver 23, and receives power charged from the power driver 23. In the case where the power driver 23 is disconnected to an external power supply, the battery 28 supplies power to electrical devices in the wake-up light 2.

Figure 3:
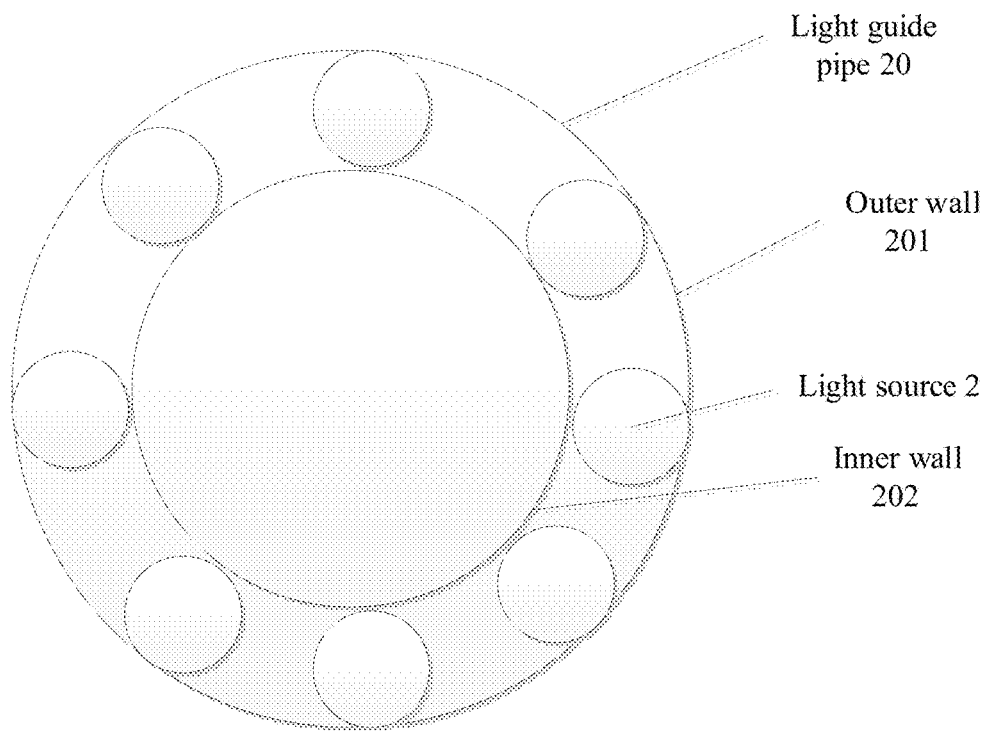
FIG. 3 is a bottom view or a top view of a light guide pipe.

FIG. 3 is a bottom view or a top view of a light guide pipe.

As illustrated in FIG. 2 and FIG. 3, an outer wall 201 of the light guide pipe 20 is made of a transparent material, the light source 24 is arranged on an upper surface and/or a lower surface of the light guide pipe, and light rays of the light source 24 are directed to an area between an inner wall 202 and the outer wall 201 of the light guide pipe 20, and are propagated and mixed in the area between the inner wall 202 and the outer wall 201 of the light guide pipe 20.

The inner wall 202 of the light guide pipe 20 is coated with reflective paper (not illustrated in the figure) for reflecting the light rays out of the light guide pipe 20 and preventing the light rays from entering a space enclosed by the inner wall. The reflective paper can improve a lighting effect, and also prevents the user from seeing electrical device components such as the power driver 24 in the space enclosed by the inner wall of the light guide pipe 20. Through diffuse reflection and reflection by the reflective paper on the inner wall 202, the light rays are finally emitted from the light guide pipe 20 to the shade 21, and then emitted from the shade 21. It is a preferred solution to arrange light sources 24 on both upper and lower ends of the light guide pipe 20. Light is emitted into the light guide pipe 20 from both upper and lower ends. In this way, a light intensity can be increased, and upper and lower light sources can be set to different colors. Different colors of light are mixed in the light guide pipe to achieve different color effects, which facilitates to visual stimulation of the user. In addition to the preferred solution, only the upper end of the light guide pipe 20 can be provided with the light source 24, or only the lower end of the light guide pipe 20 can be provided with the light source 24.

The wake-up lights 1 and 2 in the present application are only examples of wake-up light structural diagrams, and structures of the wake-up light are not limited to the two structures mentioned above.

Figure 4:
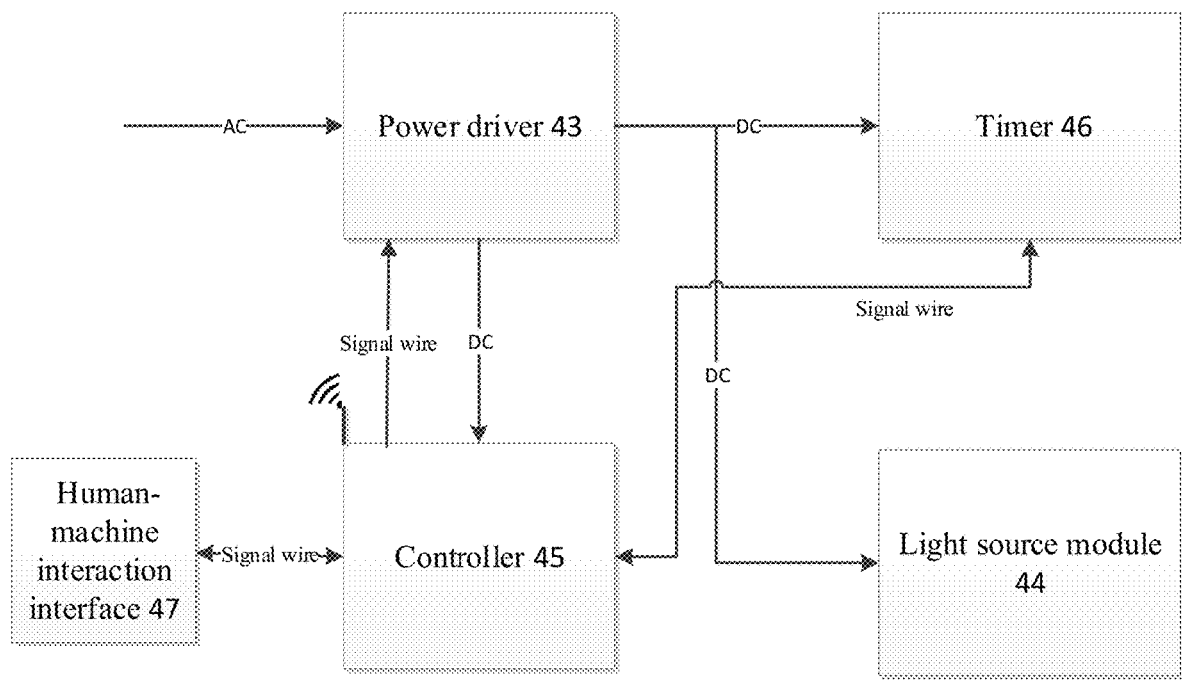
FIG. 4 is a schematic structural diagram of an internal circuit of a wake-up light in the present application.

FIG. 4 is a schematic structural diagram of an internal circuit of a wake-up light in the present application.

The circuit structure in FIG. 4 can be applied to the wake-up lights in FIG. 1 and FIG. 2. As illustrated in FIG. 4, a power driver 43 is externally connected to an alternating current of 220V, converts the alternating current of 220V to a direct current of 12V/5V, and supplies the direct current to a controller 45, a timer 46, and a light source 44. The controller 45 is connected to the power driver 43, the timer 46, and a human-machine interaction interface 47 through signal wires. The controller 45 sends information required to be displayed to the human-machine interaction interface 47 to achieve information displaying, where the displayed information includes status information of the wake-up light, and the like. A user operates the human-machine interaction interface 47 to send setting information to the controller 45, where the setting information includes timing information, turn-off of the light source 44 or a power supply, and the like. The controller 45 can also communicate with a mobile terminal (not illustrated in the figure) through a wireless module, receive setting information of the mobile terminal, and send status information of the wake-up light to the mobile terminal.

Figure 5:
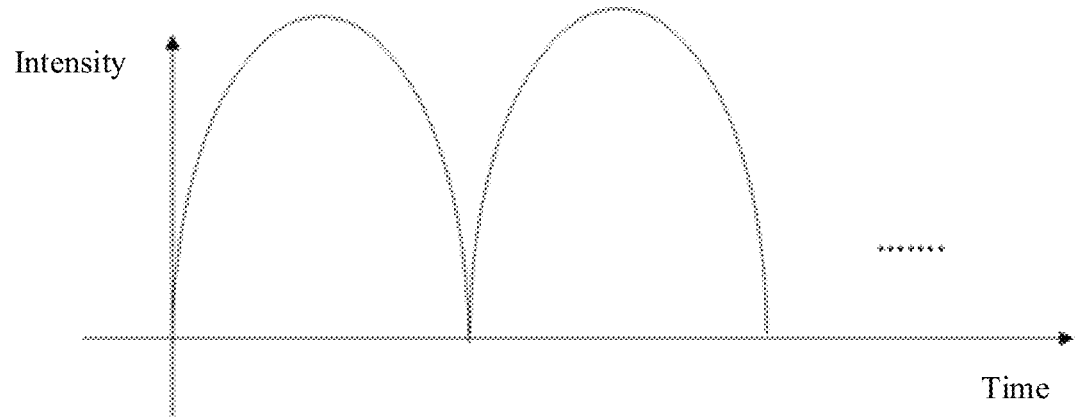
FIG. 5 is a schematic diagram of a preferred periodic high-intensity light ray changing curve in the present application.
Figure 6:
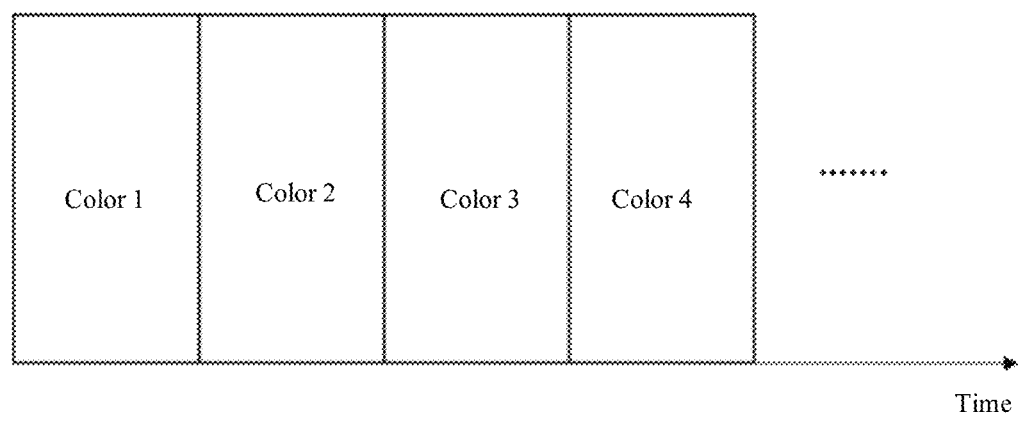
FIG. 6 is a schematic diagram of preferred periodic light rays of different colors in the present application.

After receiving an alarm time set by the user, the controller 45 compares the alarm time with a real time received by the timer 46. When the real time is N minutes before the alarm time (a value of N is a system default or set by the user), the controller 45 sends a lighting start signal to the power driver 43, the power driver 43 gradually regulates light source brightness of the light source 44 after receiving the lighting start signal. When the real time reaches the alarm time, the controller 45 sends an impulsive light signal to the power driver 43, and the power driver 43 regulates the light source 44 to emit impulsive light after receiving the impulsive light signal. The impulsive light can be periodic light rays with high intensity, or periodic light rays of different colors. FIG. 5 is a schematic diagram of a preferred periodic high-intensity light ray changing curve in the present application; and FIG. 6 is a schematic diagram of preferred periodic light rays of different colors in the present application. The impulsive light can also be a combination of light rays with high intensity and light rays of different colors. The impulsive light is not limited to the three modes mentioned above, and further includes other light ray changes that can bring the user impulsive feelings.

Further, the wake-up light further includes a human-machine interaction interface; the human-machine interaction interface is installed on the housing and connected to the controller; and the human-machine interaction interface is configured to receive time settings of the user and send the set time to the controller.

Further, the human-machine interaction interface is configured with a time display for displaying time information and/or a status display for displaying status information of the wake-up light.

Further, the set first time is earlier than the set second time.

Further, the light guide element is a light guide pipe; and the light guide pipe is of an annular cylindrical structure.

Further, the light guide pipe includes an inner wall and an outer wall; and light rays formed by light sources of the light source are directed into a space between the inner wall and the outer wall.

Further, the power driver, the controller, and the timer are disposed in a space enclosed by the inner wall of the light guide pipe.

Further, the wake-up light further includes a human-machine interaction interface; the human-machine interaction interface is installed on the housing and connected to the controller; and the human-machine interaction interface is configured to receive time settings of the user and send the set time to the controller.

Further, the set first time is earlier than the set second time.

The beneficial effects of the present application are: the new type of wake-up light in this application slowly increases the brightness before the time set by the user is reached, so that the user gradually wakes up from deep sleep to light sleep, avoiding sudden alarms or light, which causes users discomfort; when the time set by the user is reached, the wake-up light emits an impulsive light, so that the user wakes up from sleep quickly, and at the same time avoids the alarm from affecting other people's rest. This application allows the user to gradually wake up from deep sleep to light sleep, avoiding sudden alarms or light, which causes the user discomfort.

Although the preferred embodiments of the present application have been described, a person skilled in the art can make additional variations and modifications to these embodiments once they know the basic inventiveness concept. Therefore, the appended claims are intended to be explained as including the preferred embodiments and all the variations and modifications falling within the scope of the present application.

Apparently, a person skilled in the art can make various variations and modifications to the present application without departing from the spirit and scope of the present application. Thus, if these modifications and variations of the present application fall within the scope of the claims of the present application and their equivalent technologies, the present application is also intended to include such modifications and variations.

The invention claimed is:

1. A wake-up light, comprising:
a shade, a housing, a power driver, a controller, a light source, a timer, and a light guide pipe, wherein
the power driver, the light source, the controller, and the timer are installed in a space enclosed by the shade and the housing;
the power driver is externally connected to an alternating current, and supplies power to the timer and the light source;
the timer is configured for real-time timing;
the controller is connected to the light source and the timer;
the controller receives timing information of the timer;
the light guide pipe is of an annular cylindrical structure;
the light guide pipe comprises an inner wall and an outer wall;
light rays formed by a light source of the light source are directed into a space between the inner wall and the outer wall;
the power driver, the controller, and the timer are disposed in a space enclosed by the inner wall of the light guide pipe;
in response to determining that a first time set by a user is reached, the controller sends a light-source light-up signal to the light source, so that a light intensity of the light source is gradually increased; and
in response to determining that a second time set by the user is reached, the controller sends an impulsive light signal to the light source, so that the light source uninterruptedly emits impulsive light.

2. The wake-up light according to claim 1, wherein
the wake-up light further comprises a human-machine interaction interface;
the human-machine interaction interface is installed on the housing and connected to the controller; and
the human-machine interaction interface is configured to receive time settings of the user and send the set time to the controller.

3. The wake-up light according to claim 2, wherein
the human-machine interaction interface is configured with a time display for displaying time information.

4. The wake-up light according to claim 2, wherein
the human-machine interaction interface is configured with a status display for displaying status information of the wake-up light.

5. The wake-up light according to claim 1, wherein
the set first time is earlier than the set second time.

6. A wake-up light, comprising:
a shade, a base cover, a light source, a timer, a controller, and a light guide element, wherein
the light source, the controller, the timer, and the light guide element are installed in a space enclosed by the shade and the base cover;
a light source is arranged on an upper surface and/or a lower surface of the light guide element;
light rays of the light source are directed to the inside of the light guide element;
the timer is configured for real-time timing;
the controller is connected to the light source and the timer;
the controller receives timing information of the timer;
in response to determining that a first time set by a user is reached, the controller sends a light-source light-up signal to the light source, so that a light intensity of the light source is gradually increased; and in response to determining that a second time set by the user is reached, the controller sends an impulsive light signal to the light source, so that the light source uninterruptedly emits impulsive light, wherein the light guide element is a light guide pipe; the light guide pipe is of an annular cylindrical structure; the light guide pipe comprises an inner wall and an outer wall; and light rays formed by a light source of the light source are directed into a space between the inner wall and the outer wall.

7. The wake-up light according to claim 6, wherein the power driver, the controller, and the timer are disposed in a space enclosed by the inner wall of the light guide pipe.

8. The wake-up light according to claim 6, wherein
the wake-up light further comprises a human-machine interaction interface;
the human-machine interaction interface is installed on the base cover and connected to the controller; and
the human-machine interaction interface is configured to receive time settings of the user and send the set time to the controller.

9. The wake-up light according to claim 6, wherein the set first time is earlier than the set second time.

10. A wake-up light, comprising:
a shade, a base cover, a light source, a timer, a controller, and a light guide element, wherein
the light source, the controller, the timer, and the light guide element are installed in a space enclosed by the shade and the base cover;
a light source is arranged on an upper surface and/or a lower surface of the light guide element;
light rays of the light source are directed to the inside of the light guide element;
the timer is configured for real-time timing;
the controller is connected to the light source and the timer;
the controller receives timing information of the timer; and
the power driver, the controller, and the timer are disposed in a space enclosed by an inner wall of the light guide element.

11. The wake-up light according to claim 10, wherein the light guide element is a light guide pipe having an annular cylindrical structure.

12. The wake-up light according to claim 11, wherein the light guide pipe comprises an outer wall.

* * * * *